No. 660,655. Patented Oct. 30, 1900.
A. VON PODEWILS.
PROCESS OF RENDERING FATS.
(Application filed Oct. 20, 1899.)
(No Model.)
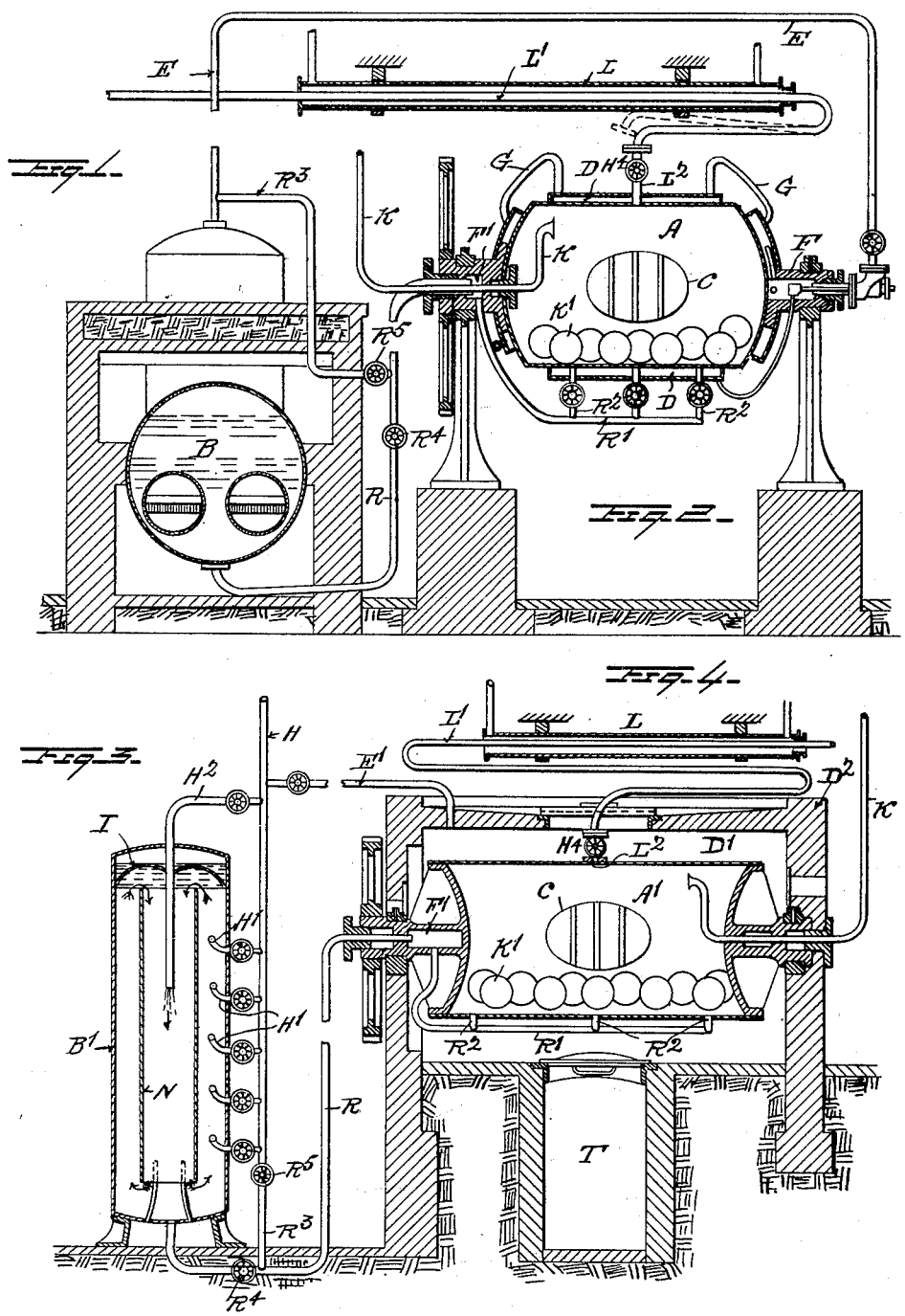
Witnesses
Inventor
Adalbert von Podewils
by his Attorney

UNITED STATES PATENT OFFICE.

ADALBERT VON PODEWILS, OF MUNICH, GERMANY.

PROCESS OF RENDERING FATS.

SPECIFICATION forming part of Letters Patent No. 660,655, dated October 30, 1900.

Application filed October 20, 1899. Serial No. 734,179. (No specimens.)

*To all whom it may concern:*

Be it known that I, ADALBERT VON PODE-WILS, a subject of the German Emperor, and a resident of Glückstrasse 8, Munich, Germany, have invented certain new and useful Improvements in Processes of Sterilizing and Removing Fat from Animal-Carcasses, of which the following is a specification.

Sterilization and removal of fat from animal-carcasses or parts of the same are done in the apparatus at present used by means of steam under pressure or by boiling liquid—that is to say, in a state of ebullition. Both methods possess inherent disadvantages. It has been found that the effect of compressed steam upon the substance is much hindered by the air contained in the latter and also by the gas developed in the process. With such process it is therefore necessary that the substances remain for a long time under the influence of steam (or rather of the mixture of steam, air, and gas) in order to bring the larger and firmer muscular tissues to the high temperature required by the process. When the substance is boiled in hot liquid, the process is, if the boiling takes place without overpressure, still slower than when steam is used, and if the boiling ebullition takes place under pressure a thick pulp and emulsion of fat is produced in the liquid extract, from which the fat can only be separated in a very incomplete degree.

In the novel process hereinafter described the action of steam or liquid in a state of ebullition is replaced by a lixiviation in liquid heated under pressure to above 100° Celsius, the liquid being kept at higher pressure than would correspond with its boiling or ebullition temperature. The ebullition of the liquid as long as it is in contact with the substance under treatment is thus prevented and the gas which is formed is immediately and energetically forced out by the liquid under pressure.

As compared with the steaming process and the boiling process without pressure this new process is more intense and rapid. It differs from the process of boiling under pressure, since the formation of emulsion is avoided, the method of obtaining the fat is easier, and the amount of fat obtained larger.

Convenient apparatus for carrying this process into effect is illustrated in the annexed sheet of drawings, in which—

Figure 1 is a vertical section of a boiler or heater for the lixiviating liquid, and Fig. 2 is a similar section of a fat-cooler and of a lixiviation vessel shown connected to said boiler. Fig. 3 is a vertical section of a modified form of heater for the lixiviating liquid, and Fig. 4 is a similar section of the fat-cooler and another form of lixiviating vessel shown connected to the heater of Fig. 3.

The time necessary for carrying out the process is diminished by heating the liquid in a separate vessel and then conducting the said liquid once or several times, according to the size and nature of the carcass, into the lixiviating vessel in which the carcass is placed.

In the drawings, A or A' represents the principal vessel in which the carcass is placed, and B or B' represents a separate pressure vessel in which the liquid is heated.

The principal vessel A or A' must be arranged to close hermetically—for example, with a door C—and it is preferably rotarily movable. It is desirable to construct the said vessel in such a manner that after the lixiviating process has been completed the carcass freed from fat can be dried therein. For this purpose the carcass vessel A (represented in Fig. 2 as a single cylinder) would be provided with jackets D, and for the purpose of drying the carcass steam would be conducted therein from the boiler B—for example, through pipe E, hollow axle F, and pipes G G. In Fig. 4 the vessel A' is inclosed in a masonry chamber $D^2$, equivalent to the jacket D, and having a space D' surrounding the vessel A', into which steam may pass from pipe H through branch pipe E'.

The separate vessel B for heating under pressure is shown in Fig. 1 as a horizontal steam-boiler which would be heated by fire direct; but as it is desirable to conduct the whole process as rapidly as possible it is advisable that the repeated heating of the liquid should be effected as quickly as possible. I therefore prefer to use the heater shown in Fig. 3, in which the liquid is heated by admitting steam directly into the liquid. A steam-supply pipe H has branches H' leading to the interior of the vessel B'. The steam is introduced tangentially and directed a little upward at several points, so that the liquid in the cylindrical vessel B' is given a forcible rotating motion. There is arranged inside this vessel B' an open-ended cylinder N, and a branch pipe H² leading from steam-pipe H, passes axially downward into the space within the cylinder N. At the upper part of the vessel a suitably-formed plate I is arranged, so that the liquid rising near the periphery of the cylinder in consequence of the rotation movement is led to the center, so that by means of the steam issuing from pipes H² and H' a downward flow is produced in the inner cylinder N and an upward helicoidal flow in the outer part of the vessel B', and all the liquid passes quickly and closely to the different steam-nozzles.

A pipe R connects the water-space of the heater B or B' to the hollow trunnion F' of the vessel A, and from this trunnion a pipe R' carries the liquid to several place-pipes R², entering the vessel A at different places along a line parallel to its axis. A branch pipe R³ leads from the steam-pipe E in Fig. 1 or H in Fig. 3 into the pipe R at a suitable place, and stop-cocks R⁴ R⁴ R⁵ R⁵ are provided for stopping off either the supply of liquid or of steam, as the case may be, to the vessel A or A'.

L represents a Liebig cooler and through it passes a pipe L', which may be removably connected to a length of pipe L², projecting from the vessel A or A', respectively.

H⁴ is a stop-cock in pipe L².

K is a pipe passing through one of the trunnions and turned upwardly in the vessel A or A', so as to open therein near the uppermost part of the vessel.

K' shows balls running loose in the vessel A or A' for disintegrating the fiber and other solid matter when it is afterward desiccated. T is a pit for receiving such disintegrated matter when removed from the cylinder.

The method of employing the two vessels described is as follows: The carcass is placed inside the carcass vessel A or A'. In the vessel B or B' liquid is heated under pressure to a temperature above 100° Celsius and passed through the pipe R into the carcass vessel. In the latter the hot liquid is kept at a pressure which is higher than that corresponding to its boiling temperature. After the rapid exchange of heat, which takes place without ebullition, part of the liquid—i. e., its middle layers—is forced through the pipe R', (which is brought to at a convenient height by turning the vessel A') back into the heating vessel B or B', where it is reheated and forced back again into the treatment-cylinder A or A'. This is repeated as many times as required to bring the whole substance to the desired temperature. The movement of the liquid from the vessel B or B' to the vessel A or A' and back is effected by using with the aid of compressed air or steam at higher pressure first one and then the other of the vessels as a liquid-raiser. For the further acceleration of the sterilizing and fat-removing process the lixiviating process can be combined in some suitable manner with the evaporization process by introducing steam into the vessel A or A' during the heating of the liquid or afterward, or also simultaneously with the introduction of the same into the treatment-cylinder. The steam required for this purpose can be taken from a steam-boiler, or can be generated in the vessel B from the liquid itself.

In order to take off the fat separated by the process and swimming on top of the liquid, the vessel A or A' is rotated until it is in the position illustrated and the pipes L' and L² are coupled. Liquid is now forced from the vessel B or B' into the vessel A or A' until the latter is filled entirely and the fat lifted to the cock H⁴, which being open allows it to pass off through pipes L² L'. Since the fat has been heated with the whole mass to over 100° Celsius and with the last fat particles there will also pass over some of the solution or extract, an emulsion would be formed by ebullition which would take place at the exit of the heated watery solution. In order to prevent this formation of emulsion, the outlet-pipe L' passes through the cooler, wherein the fat and small quantity of solution can be easily cooled to below 100° Celsius. After the fat has been removed the liquid employed as heating agent in the vessel A or A' is moved back into the pressure vessel B or B' in order to be used again. After being used a number of times the said liquid will form a meat extract of considerable concentration, which can be brought to a further degree of concentration by subsequent treatment.

I declare that what I claim is—

1. An improved method of sterilizing animal-carcasses and removing the fat therefrom consisting in exposing them to liquid heated to above 100° Celsius and kept during its contact with the carcass material at a higher pressure than that corresponding to its boiling temperature in order to prevent ebullition.

2. The improved process for sterilizing animal-carcasses and removing fat therefrom consisting in repeatedly immersing them in liquid heated to above 100° Celsius under pressure preventing ebullition.

3. The improved process for sterilizing animal-carcasses and removing fat therefrom consisting in repeatedly immersing them in liquid heated to above 100° Celsius under pressure preventing ebullition and discharging the separated fat by further injection of liquid into the carcass vessel.

4. The improved process for sterilizing animal-carcasses, removing fat therefrom and separating the fat from the sterilizing liquid, consisting in repeatedly immersing the carcass in liquid heated to above 100° Celsius under pressure preventing ebullition, discharging the separated fat from the carcass vessel by further injection of liquid therein and passing said discharged fat directly into a cooler.

In witness whereof I have signed this specification in the presence of two witnesses.

ADALBERT VON PODEWILS.

Witnesses:
MAX GUGET,
EMIL HENZEL.